(12) United States Patent
Stevenson et al.

(10) Patent No.: US 8,136,749 B2
(45) Date of Patent: Mar. 20, 2012

(54) CHICKEN CARCASS COMPOSTER

(75) Inventors: C. Hugh Stevenson, Petrolia (CA);
Malcom Newall, Petrolia (CA); Kevin LaPaire, Petrolia (CA)

(73) Assignee: Container Design Services, Petrolia (CA)

( * ) Notice: Subject to any disclaimer, the term of this patent is extended or adjusted under 35 U.S.C. 154(b) by 0 days.

(21) Appl. No.: 12/713,603

(22) Filed: Feb. 26, 2010

(65) Prior Publication Data

US 2011/0049281 A1   Mar. 3, 2011

Related U.S. Application Data

(60) Provisional application No. 61/155,703, filed on Feb. 26, 2009.

(51) Int. Cl.
*B02C 18/16* (2006.01)
(52) U.S. Cl. .................................. 241/243; 241/294
(58) Field of Classification Search ............ 241/243, 241/294, 300, 242
See application file for complete search history.

(56) References Cited

U.S. PATENT DOCUMENTS

| | | | |
|---|---|---|---|
| 4,773,605 A * | 9/1988 | Jensen | 241/243 |
| 5,076,504 A | 12/1991 | Young | |
| 5,547,420 A | 8/1996 | Stikeleather et al. | |
| 5,899,803 A | 5/1999 | Welch | |
| 6,055,917 A | 5/2000 | Shortnacy | |
| 6,394,375 B1 * | 5/2002 | Balvanz et al. | 241/197 |
| 6,638,757 B1 | 10/2003 | Teran et al. | |

* cited by examiner

*Primary Examiner* — Mark Rosenbaum
(74) *Attorney, Agent, or Firm* — Shoemaker and Mattare (57) ABSTRACT

A device for shredding poultry carcasses, includes a frame supporting a comminuting unit and a drive unit. The comminuting unit includes a drum mounted on a rotatable shaft, the drum having a generally cylindrical surface and an array of cutting points affixed to the drum, protruding from the surface, and a stationary comb having an array of teeth separated by spaces, and extending close to the drum surface so that the points pass between the teeth as the drum rotates. The drive unit turns the drum to reduce the carcasses to a compostable mass.

7 Claims, 9 Drawing Sheets

CHICKEN CARCASS COMPOSTER

This application claims benefit of provisional application 61/155703, filed Feb. 26, 2009.

BACKGROUND OF THE INVENTION

This invention relates to an apparatus for shredding fowl carcasses into comminuted carcass material which may be composted in windrows or otherwise disposed of or used.

Farm animals who die and cannot be butchered must be disposed of in an acceptable way. Cremation introduces carbon dioxide and other undesirable gases into the atmosphere; burying can infect ground water; and whole-animal composting is a slow process.

Prior inventors have proposed various machines for comminuting or shredding carcasses. This invention, intended primarily for chicken carcasses, is an improvement over such prior devices.

SUMMARY OF THE INVENTION

An object of the invention is to provide a machine, preferably a portable machine, which can shred carcasses of whole birds so that they can be efficiently composted above ground in an environmentally acceptable way.

These and other objects are attained by a carcass composter as described below.

BRIEF DESCRIPTION OF THE DRAWINGS

In the accompanying drawings.

DESCRIPTION OF THE PREFERRED EMBODIMENT

Figure 2:
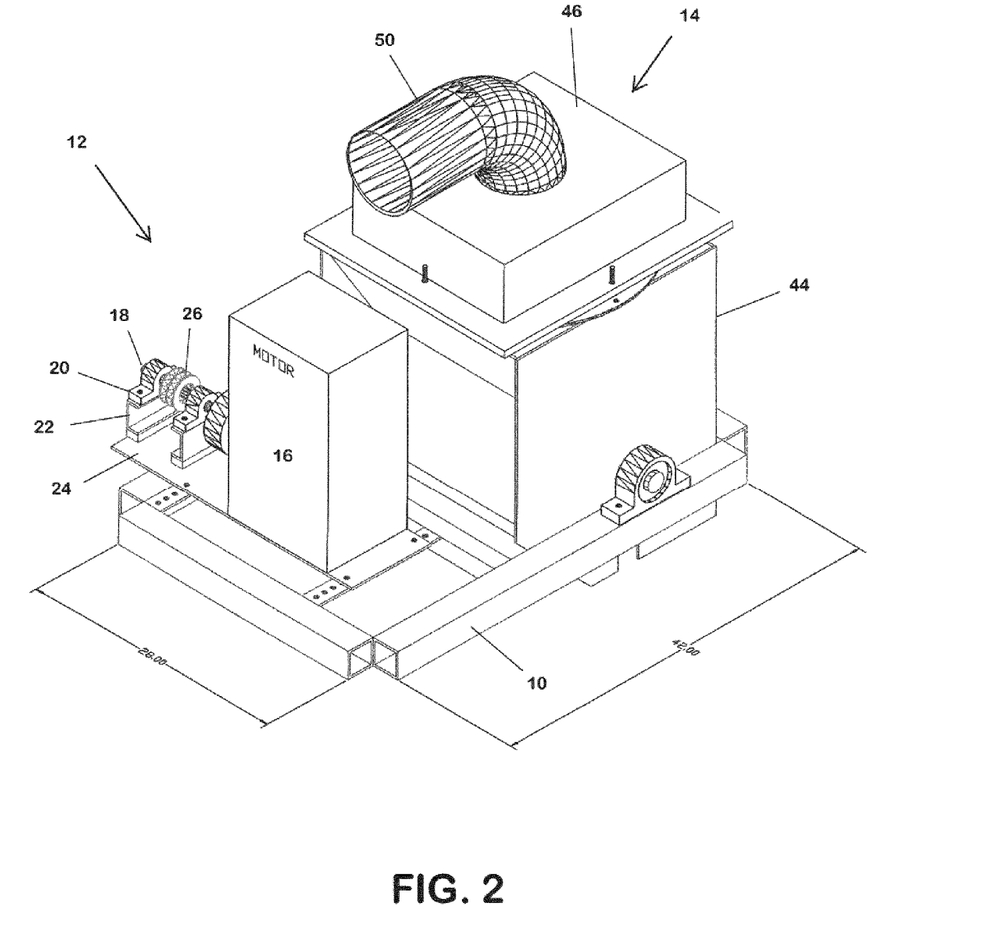
FIG. 2 is a perspective rendering thereof.
Figure 3:
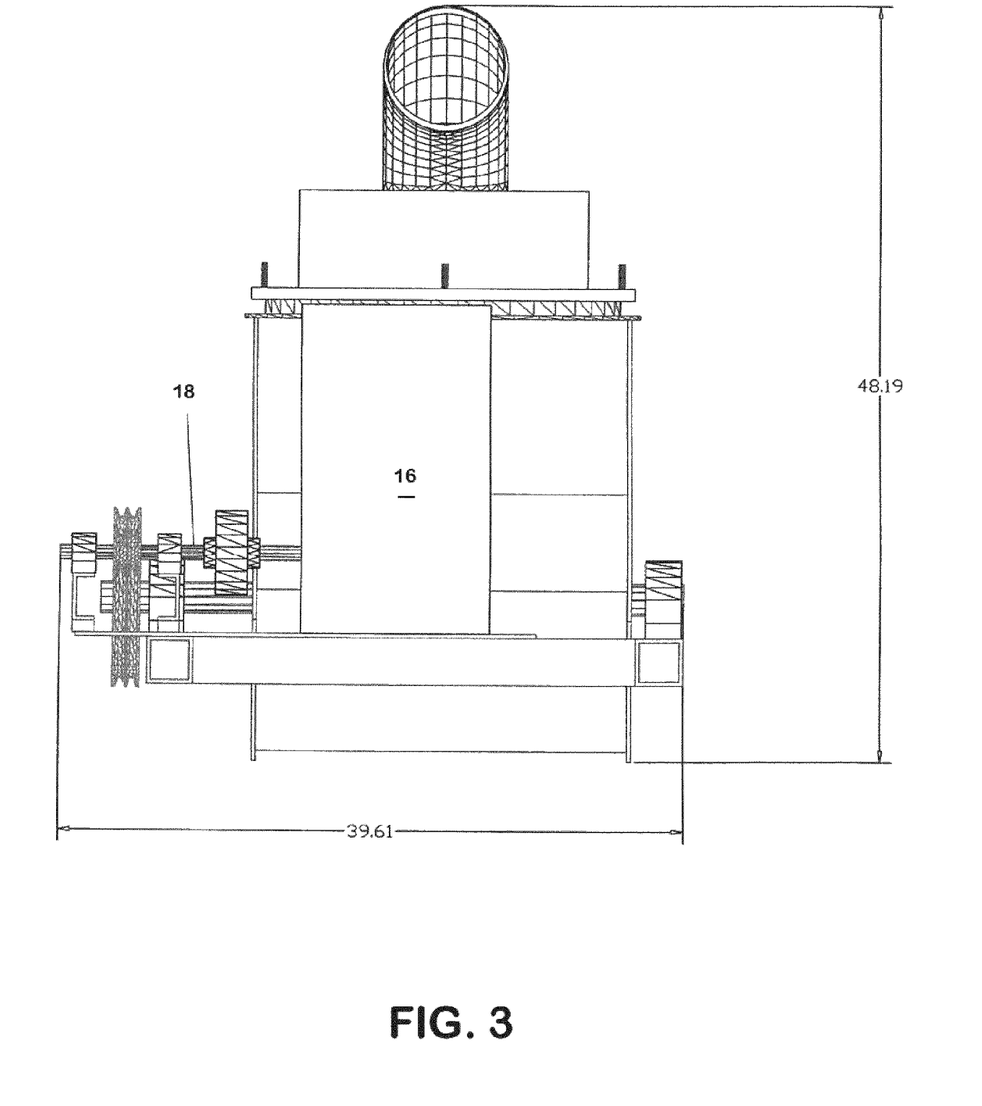
FIG. 3 is a left side elevation thereof.
Figure 4:
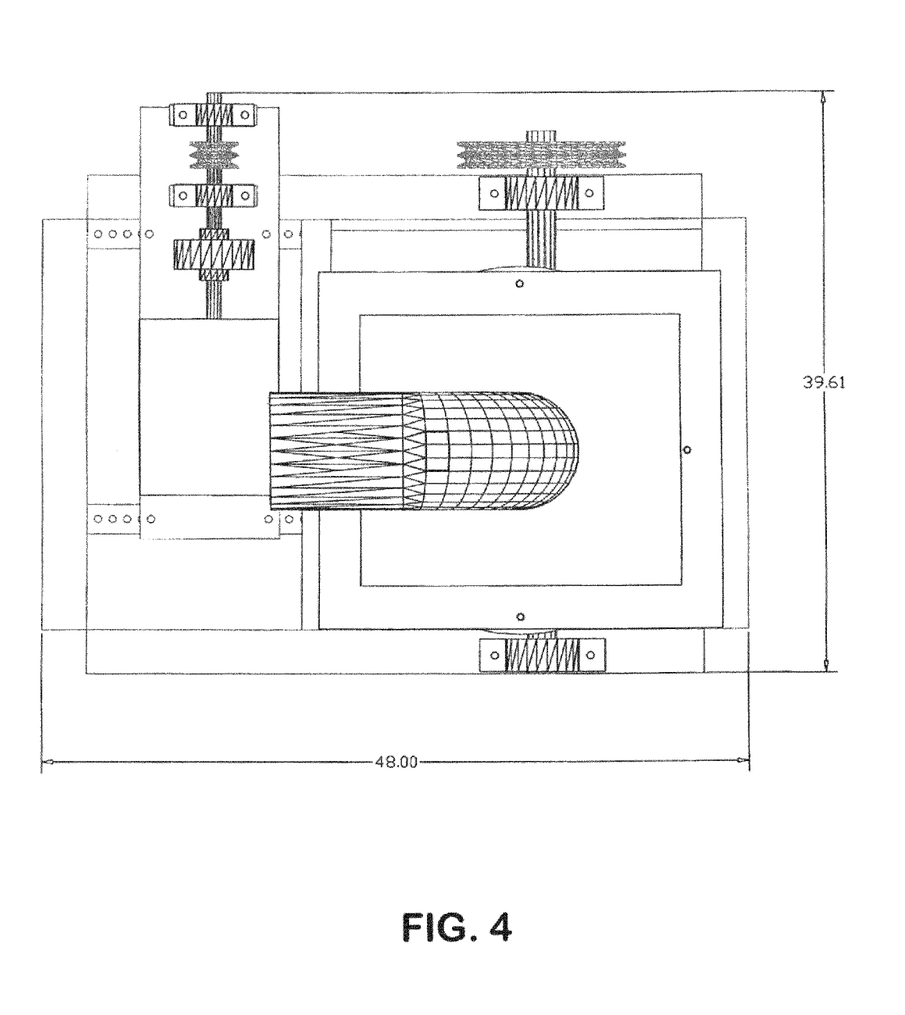
FIG. 4 is a top plan view thereof.
Figure 5:
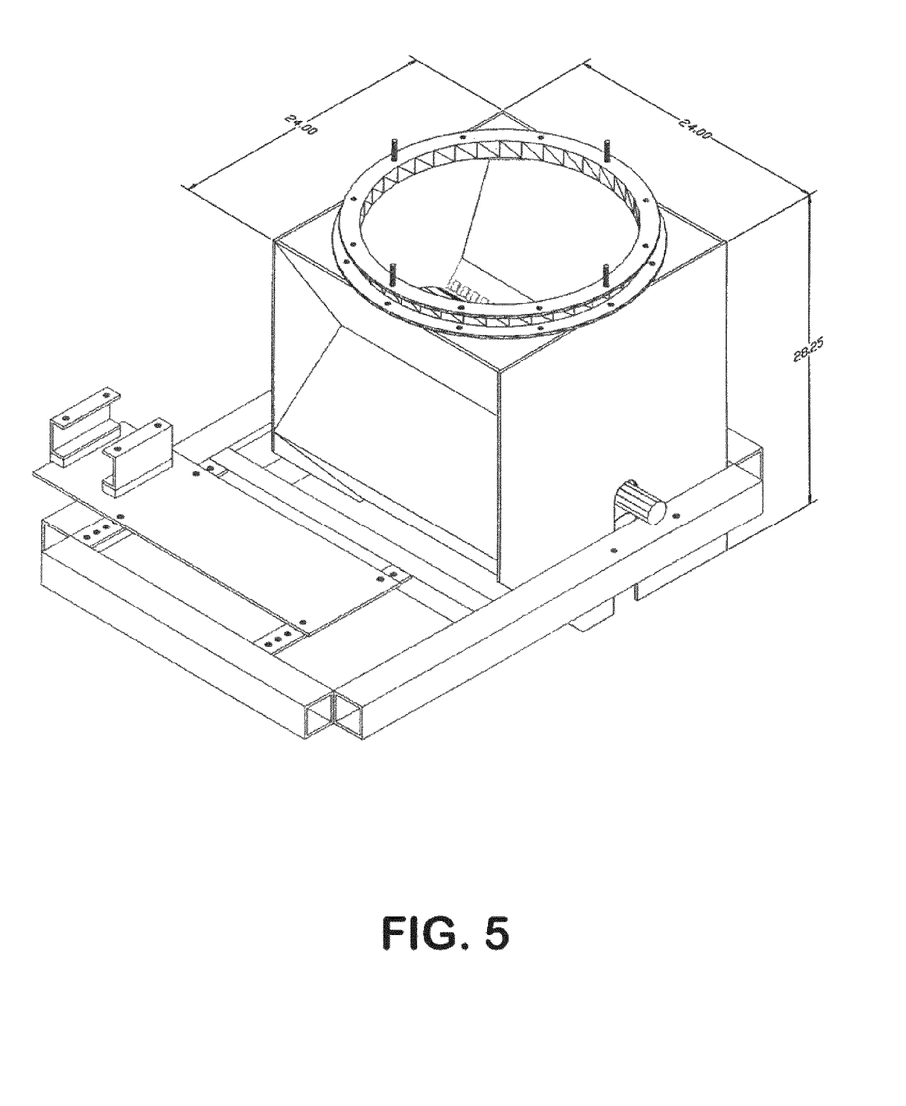
FIG. 5 is a perspective view thereof, like FIG. 1, but with some parts removed.

A chicken carcass composter embodying the invention comprises a structural frame 10 (see FIG. 2) which supports a drive unit 12 and a comminuting unit 14.

The drive unit includes a motor 16, which may be a gas/diesel engine or an electric motor. The motor could be replaced by the power take off shaft of a tractor. The motor may include a gear reduction unit. The motor's output shaft 18 is supported by a pair of pillow blocks 20 on brackets 22 attached to a base plate 24 which also supports the motor. At least one drive sprocket 26, preferably two, is/are fixed on the shaft between the pillow blocks.

Figure 6:
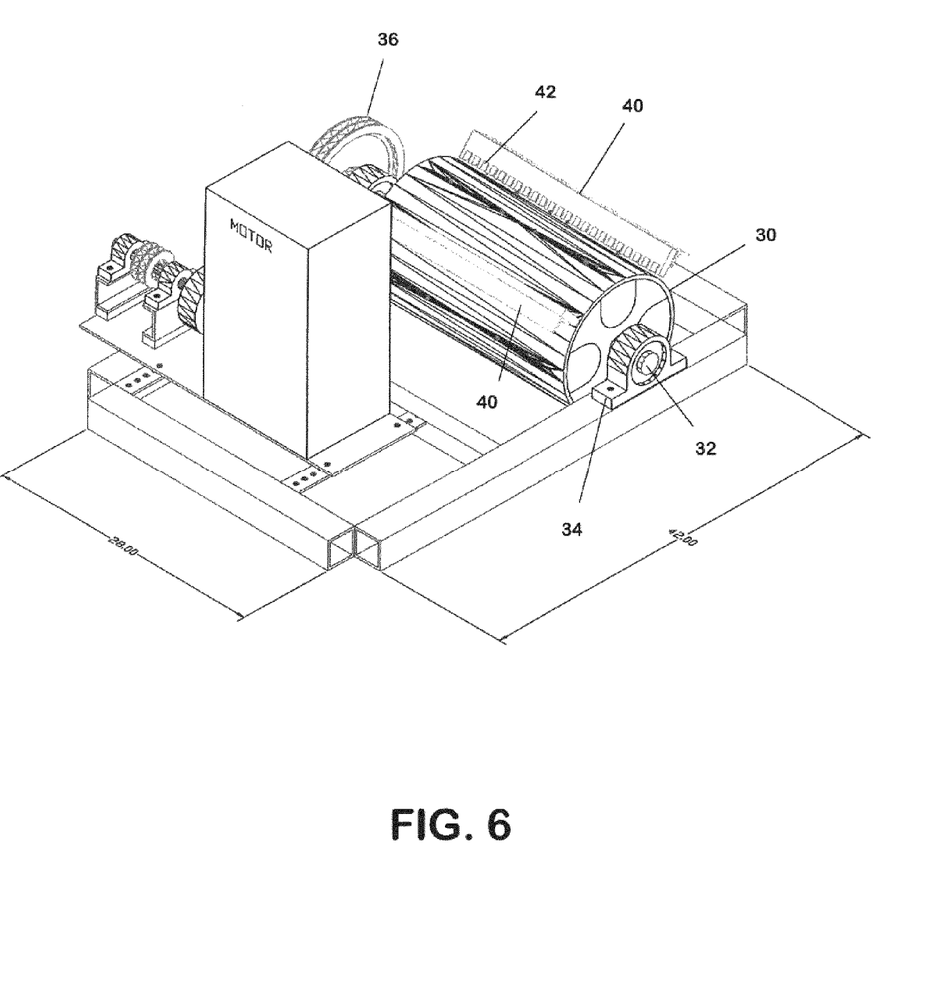
FIG. 6 is a perspective view thereof, like FIG. 1, but with other parts removed.

The comminuting unit (see FIG. 6) includes a drum 30 mounted on a common shaft 32. The ends of the shaft are supported by pillow blocks 34 attached to the structural frame. A driven sprocket 36 is mounted on the common shaft, in alignment with the drive sprocket 26. A drive chain (not shown) runs in a loop around the sprockets. The sprocket and chain could be replaced by a pulley and belt if preferred.

Figure 8:
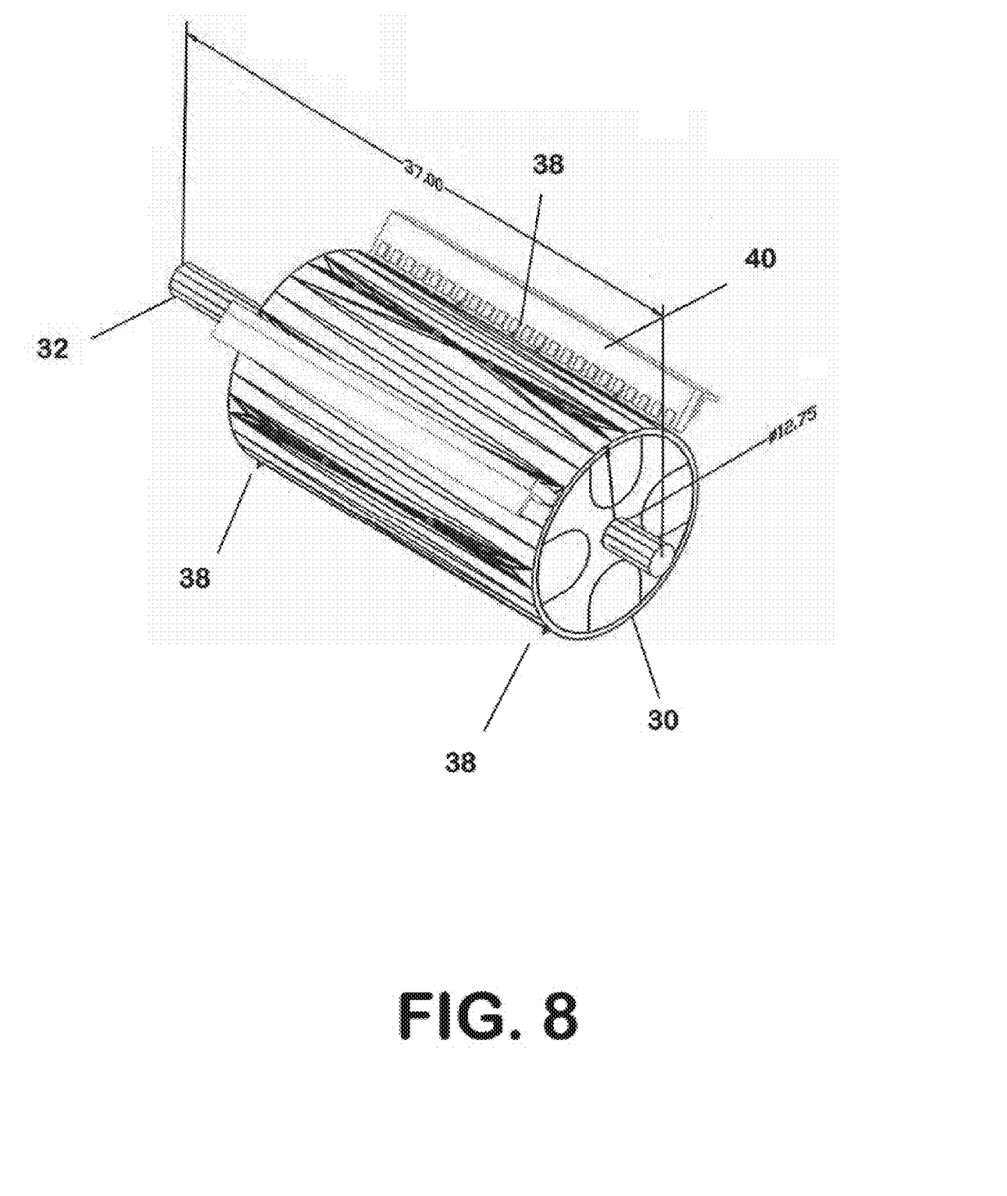
FIG. 8 is a perspective view of the working parts of the shredding mechanism.
Figure 9:
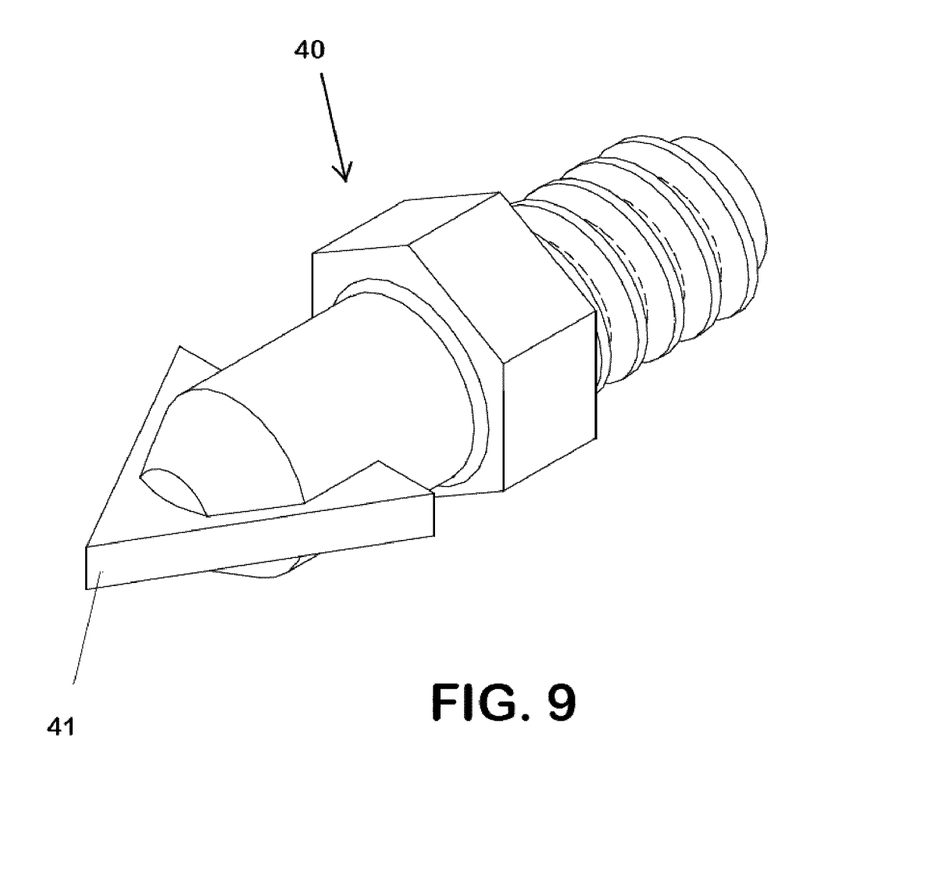
FIG. 9 is a perspective view of the drum portion of the mechanism.

The drum 30 (FIG. 8) has a generally cylindrical surface provided with an array of threaded holes in which cutting points 38 are mounted. The cutting points pass between the teeth 42 of a pair of stationary combs 40 which are supported by the housing described below. One of the cutting points 38 is shown in detail in FIG. 9. It includes helically threaded mounting screw having a hex portion which can be turned by a wrench, and a slotted head. A bit 41 having the shape of a triangular prism is seated in the slot and bonded in place. The bits are aligned, in their installed position, parallel to the length of the comb's teeth.

Figure 7:
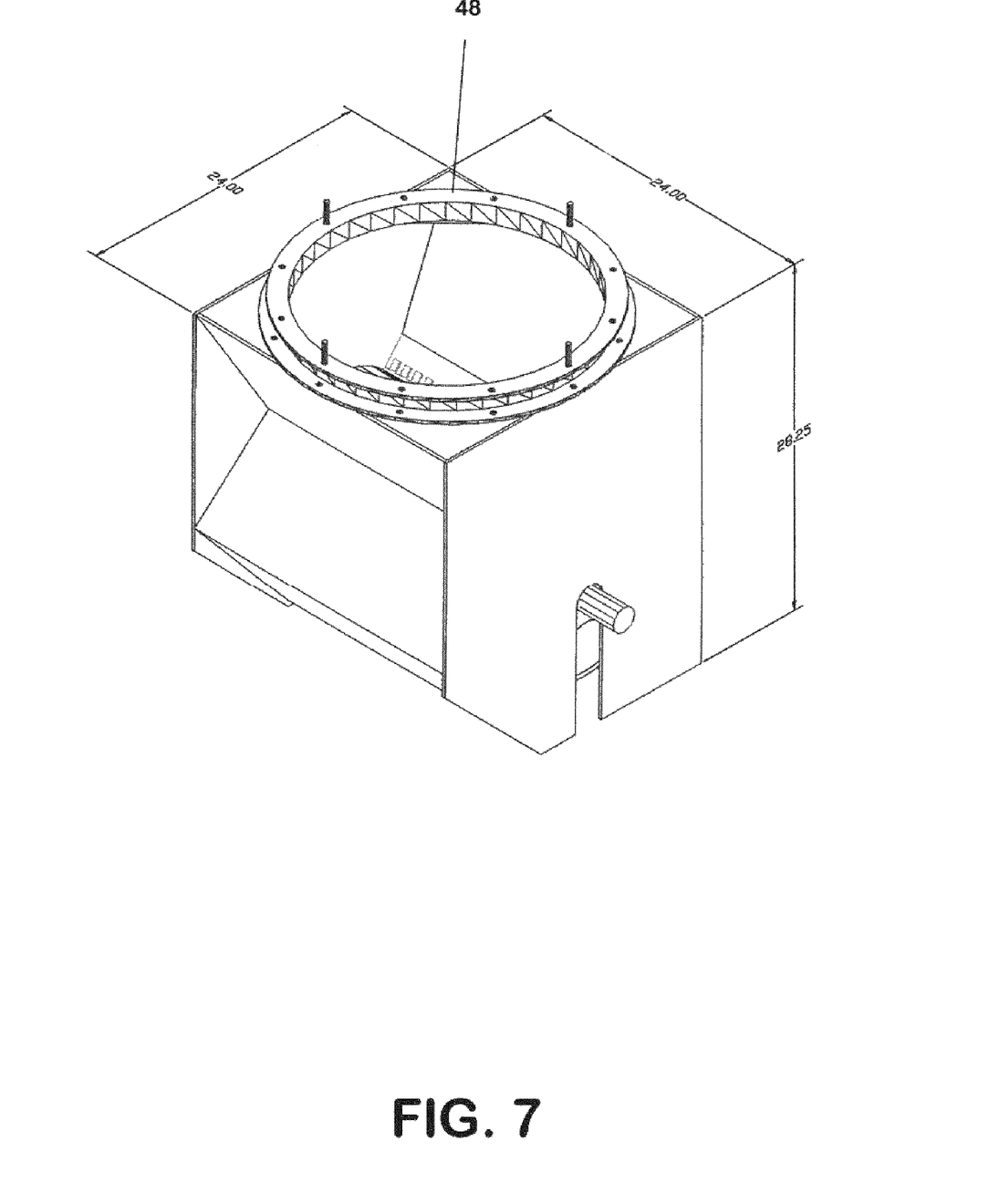
FIG. 7 is a perspective view thereof, like FIG. 1, but with yet other parts removed.

A sheet metal housing 44 (FIG. 2) is constructed around the drum and comb. At the top of the housing there is an inlet box 46 which can rotate about a vertical axis passing through the center of annular rotary bearing 48, shown in FIG. 7. This enables one to change the orientation of the chute 50 (FIG. 2) leading into the inlet box. Two positive stop studs ensure safe operation by limiting the rotation to about 180°, in directions away from the operator.

Figure 1:
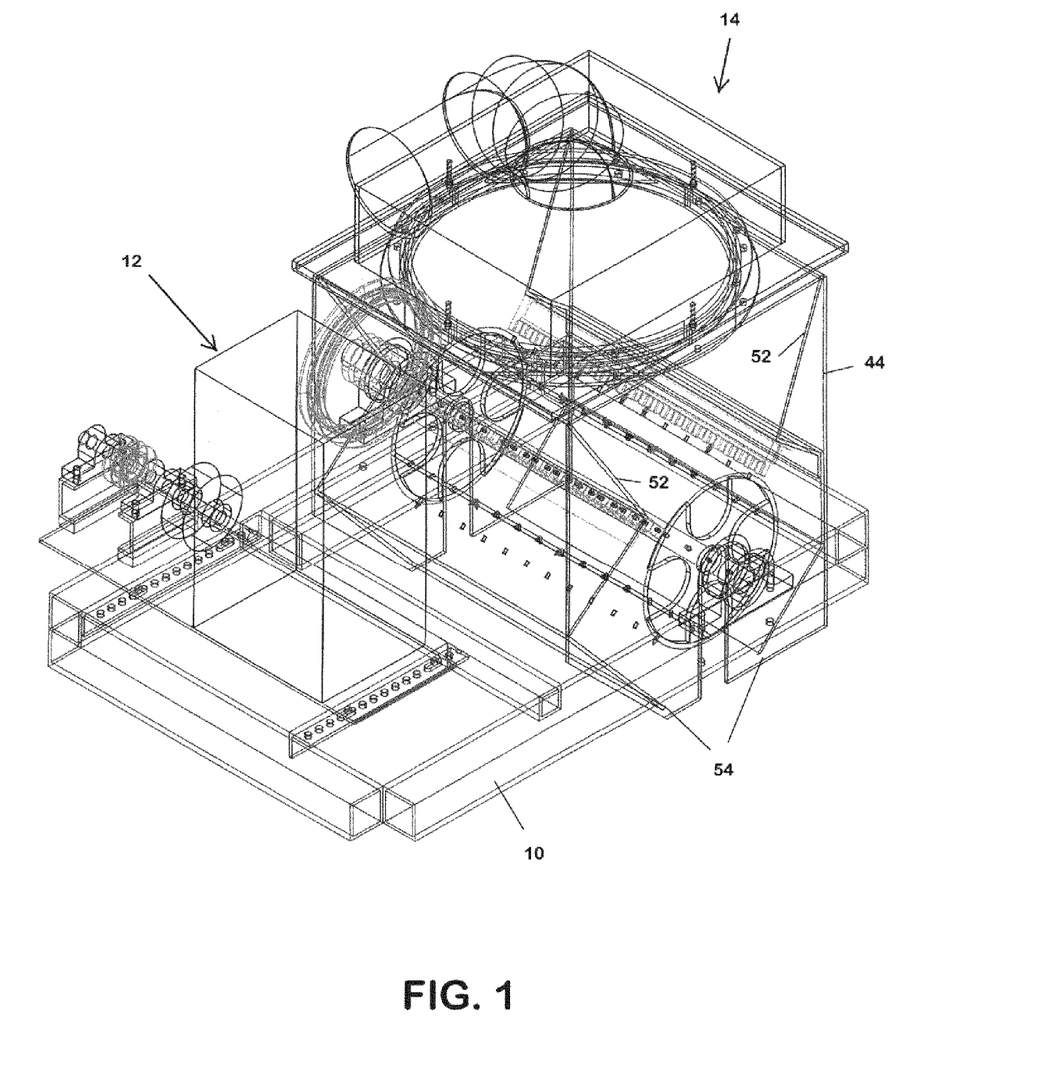
FIG. 1 is a wireframe perspective view of a chicken carcass composter embodying the invention.

Inside the housing 44 (see FIG. 1), there are opposed sheet metal entrance guides 52 converging toward the drum from above and exit guides 54 diverging away from the drum, below the drum.

Poultry carcasses are introduced to the rotating drum area by feeding them (e.g., pneumatically) through the top chute opening. The fall onto the top of the rotating drum, whose points engage the material, which is held on top of the drum by the comb until it has been reduced to pieces small enough to pass through the slots between the comb teeth. The comminuted material is discharged through the bottom of the rotating drum enclosure where it may be collected into a barrow or conveyor belt system for removal and disposal.

Since the invention is subject to modifications and variations, it is intended that the foregoing description and the accompanying drawings shall be interpreted as only illustrative of the invention.

We claim:

1. A device for shredding poultry carcasses, said device comprising
a frame supporting a comminuting unit and a drive unit, wherein
the comminuting unit comprises
a drum mounted on a rotatable shaft, the drum having a generally cylindrical surface and an array of cutting points affixed to the drum, protruding from said surface, and
a stationary comb having an array of teeth separated by spaces, and extending close to the drum surface so that the points pass between the teeth as the drum rotates, and
the drive unit comprises a motor connected to the shaft so as to turn the drum, wherein
each of said cutting points is removably attached to the drum surface,
the drum surface has an array of threaded holes for receiving the cutting points,
each of said cutting points comprises a threaded shaft sized to fit said holes and a carbide bit secured to the shaft, and
the bit has the shape of a triangular prism.

2. The invention of claim 1, further comprising a gear reduction unit between the motor and the drum shaft.

3. The invention of claim 1, further comprising at least one chain drive between the motor and the drum shaft.

4. The invention of claim 1, further comprising an inlet duct leading to the comminuting unit whereby carcasses may be pneumatically conveyed into the unit.

5. The invention of claim 4, wherein the duct is supported above the comminuting unit by an annular rotary bearing so that the orientation of the duct can be changed.

6. The invention of claim 1, further comprising entrance guides converging toward the drum from the inlet duct.

7. The invention of claim 1, further comprising exit guides diverging away from the drum from below.

\* \* \* \* \*